United States Patent

Sendelweck et al.

[11] Patent Number: 5,107,341
[45] Date of Patent: Apr. 21, 1992

[54] COLOR TELEVISION APPARATUS WITH PICTURE-IN-PICTURE PROCESSING AND WITH VARIABLE CHROMINANCE SIGNAL FILTERING

[75] Inventors: Gene K. Sendelweck; Bradley A. Sparks, both of Indianapolis, Ind.

[73] Assignee: Thompson Consumer Electronics, Inc., Indianapolis, Ind.

[21] Appl. No.: 515,493

[22] Filed: Apr. 30, 1990

[51] Int. Cl.⁵ .......................... H04N 9/74; H04N 9/64
[52] U.S. Cl. .......................................... 358/22; 358/36
[58] Field of Search .............................. 353/22, 36, 34

[56] References Cited

U.S. PATENT DOCUMENTS

| | | | |
|---|---|---|---|
| 4,384,306 | 5/1983 | Liu | 358/166 |
| 4,573,075 | 2/1986 | Bolger | 358/36 |
| 4,616,252 | 10/1986 | Schiff | 358/23 |
| 4,717,951 | 1/1988 | Fling | 358/22 |
| 4,855,812 | 8/1989 | Rokuda et al. | 358/22 |
| 4,890,162 | 12/1989 | McNeely et al. | 358/138 |

Primary Examiner—Howard W. Britton
Assistant Examiner—Wendy R. Greening
Attorney, Agent, or Firm—Joseph S. Tripoli; Peter M. Emanuel; Richard G. Coalter

[57] ABSTRACT

A color television receiver includes a picture-in-picture processor and a variable filtering circuit for imparting a "slope type" filtering characteristic to the chrominance component of displayed signals when the main picture being displayed is from a tuner video source and for imparting a "hay-stack" type filtering characteristic to the chrominance component when the main picture being displayed is from an auxiliary video source thereby providing an effective reduction in the visibility of chrominance signal sideband amplitude errors when displaying picture-in-picture images from different types of sources.

2 Claims, 1 Drawing Sheet

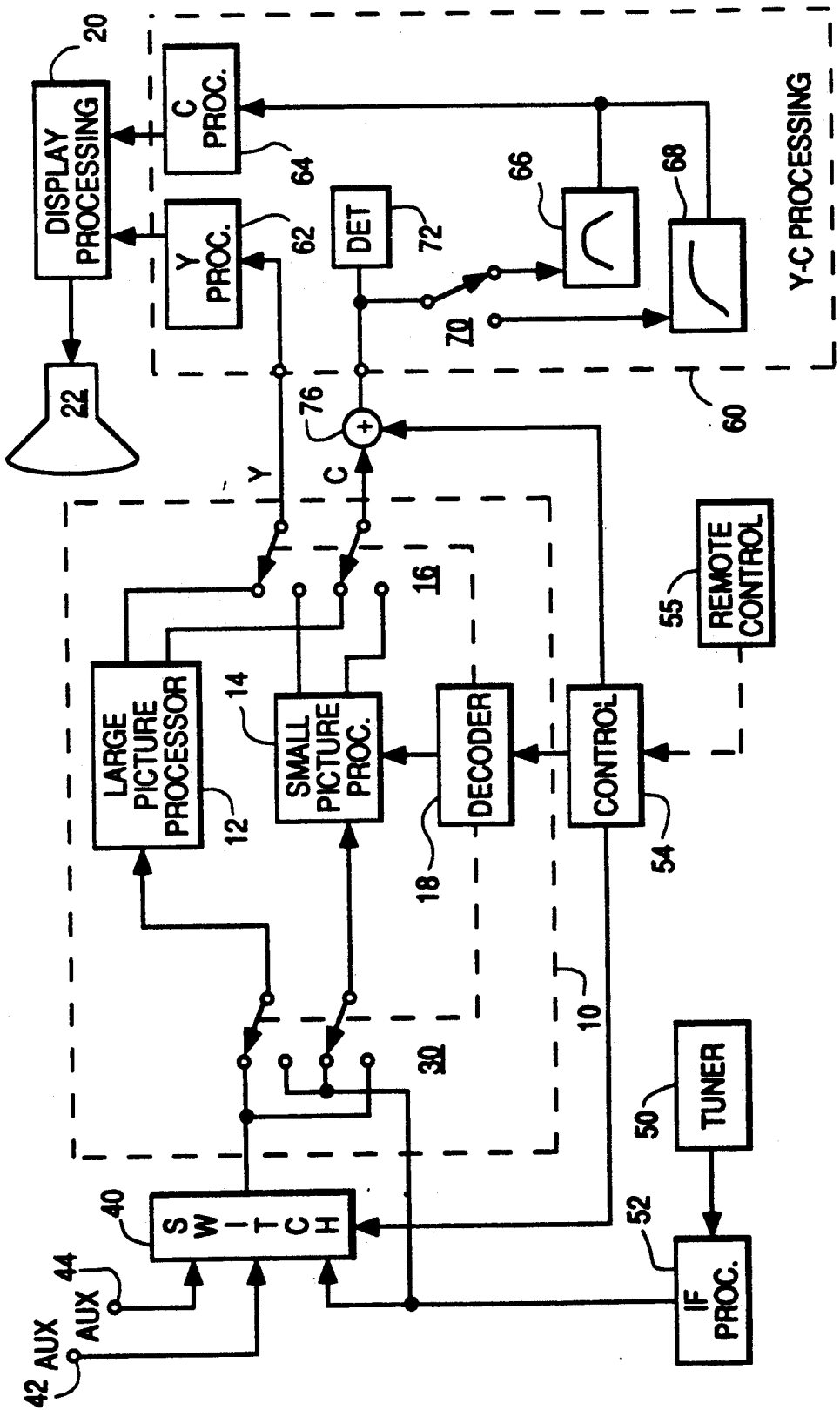

COLOR TELEVISION APPARATUS WITH PICTURE-IN-PICTURE PROCESSING AND WITH VARIABLE CHROMINANCE SIGNAL FILTERING

FIELD OF THE INVENTION

This invention relates to television receivers of a type having the capability of displaying a main picture and a smaller picture that is inset within the main picture.

BACKGROUND OF THE INVENTION

Television receivers having so-called "picture-in-picture" operating modes in which a main picture is displayed along with a smaller inset picture are known. An example of a television receiver having such features is described in U.S. Pat. No. 4,890,162 which issued to McNeely et al. Dec. 26, 1989. It is a feature of the McNeely et al. receiver that the picture-in-picture processor they disclose includes a tuner input for providing a "main" video signal, an auxiliary input for providing another source of video for the inset picture and a picture "swap" switch in the input of the processor. By this feature it is possible to reverse or interchange the main and small pictures being displayed.

SUMMARY OF THE INVENTION

It is herein recognized that in color television receivers of the type including picture-in-picture processing that a problem concerning color distortion may arise under certain conditions of input signal selection. In more detail, when one is displaying a video signal provided by a tuner and associated IF amplifier along with a video signal provided by an external source (e.g., a VCR) there are typically different chrominance signal filtering requirement for the two signals. The tuner provided signal normally requires a "slope" type of chrominance filter to compensate for the IF filter response. Specifically, a conventional IF circuit tends to attenuate the upper side-band of the chrominance signal relative to the lower sideband. To correct for this sideband distortion the chrominance signal provided by the tuner source is conventionally applied to a sideband correction filter (known as a "slope" filter) which attenuates the lower sideband of the chrominance signal relative to the upper sideband to provide a corrected chrominance output signal in which the sidebands are of balanced amplitude. On the other hand, video signal provided by an auxiliary baseband video source are typically reasonably well balanced and require only band pass filtering or a "flat" (unfiltered) response characteristic for optimum color fidelity.

From the foregoing it is apparent that different color sideband filtering requirements are needed for the two different types of video input signals. This is normally not a problem for receivers which do not have picture-in-picture processing as one may simply select the appropriate filter for the input signal being displayed. However, for receivers with picture-in-picture processing the different color sideband filtering requirements for the two simultaneously displayed images may be quite noticeable. Although chrominance amplitude equalization circuits having switchable characteristics are known, such circuits typically are not sufficiently fast to provide chrominance signal filtering changes at video signal rates and so this precludes selection of different chrominance signal filtering responses for the main and inset pictures.

The present invention is directed to meeting the need for an effective reduction in the visibility of chrominance signal quadrature distortion errors in a color television receiver employing picture-in-picture processing.

A color television receiver embodying the invention includes a picture-in-picture processor comprising a large picture processor, a small picture processor and a multiplex switch coupled to the processors for providing multiplexed luminance and chrominance output signals to a display processor for providing an image having a small picture area processed by said small picture processor that is inset within a larger picture area processed by the large picture processor. An input switch is provided having a first state for applying first and second video input signals supplied thereto to respective inputs of said large and small picture processors and having a second state for interchanging the video signals applied to said processors. A variable filtering circuit is connected between a chrominance signal output of said multiplex switch and a chrominance signal input of said display processor, said variable filtering circuit having a first operating mode for applying a first filtering response characteristic to said multiplexed chrominance signal when said first video signal is applied to said large picture processor and having a second operating mode for applying a second filter response characteristic to said multiplexed chrominance signal otherwise.

In accordance with a further feature of the invention, the receiver includes a tuner, IF amplifier and video detector unit for providing the first video signal to the input switch, the first filter response characteristic exhibits a sloped response within a chrominance signal band and the second filter response characteristic exhibits a substantially symmetrical response within the chrominance signal band.

BRIEF DESCRIPTION OF THE DRAWING

The sole FIGURE is a block diagram of a color television receiver embodying the invention.

DETAILED DESCRIPTION

As a brief overview of the color television receiver of the sole FIGURE, there is provided a picture-in-picture processor and a variable filtering circuit for imparting a first filtering characteristic to the chrominance component of displayed signals when the main picture being displayed is from a tuner video source and for imparting a second filtering characteristic to the chrominance component when the main picture picture being displayed is from an auxiliary video source thereby providing an effective reduction in the visibility of chrominance signal sideband amplitude errors when displaying picture-in-picture images from different types of sources.

The receiver of the sole FIGURE comprises a picture-in-picture processor 10 (outlined in phantom) including a large picture processor 12 (illustratively, a comb filter), a small picture processor 14 (illustratively, a random access memory and control circuit) and a multiplex switch 16 coupled to the large and small picture processors for providing a multiplexed luminance and chrominance output signals to a display processor 20 for providing an image on a kinescope 22 (or other suitable display device) having a small picture area processed by the small picture processor that is inset within a larger picture area processed by the large picture processor. An input switch 30 in processor 10 provides input signal swaping so as to interchange the large and small images displayed by kinescope 22. The switch of the double pole double throw type in which the switch outputs are coupled to video inputs of respective ones of the large and small picture processors. For the switch position shown the upper switch section couples the video signal provided by a further switch 40 to the large picture processor and the lower section couples a video output signal provided by a tuner 50 and IF processing unit 52 to the small picture processor. Reversing the position of switch 30 interchanges the coupled signals thereby interchanging the content of the large and small pictures displayed on kinescope 22. The switch 40 selects between two auxiliary input signals provided by input terminals 42 and 44 and the tuner provided baseband video signal for application to switch 30. Control of switches 30, 16 and the small picture processor is provided by a decoder 18 responsive to control signals provided by a main control unit (e.g., a microprocessor) 54 responsive to user inputs provided by a remote control unit 55.

Elements of the picture-in-picture processor are all of conventional design and a more detailed description of the processor is given in the aforementioned U.S. Pat. No. 4,890,162 of McNeely et al. which issued Dec. 26, 1989 and is herein incorporated by reference.

The receiver of the sole FIGURE further includes a luminance chrominance (Y-C) processing unit 60 which provides conventional luminance and chrominance signal processing function in units 62 and 64 which coupled the multiplexed luminance and chrominance signals provided by multiplex switch 16 to corresponding inputs of the display processing unit 20 that provides conventional functions such as matrixing, sweep generation and the like. Y-C processor 60 further includes a pair of chrominance signal filters 66 and 68 having band pass and sloped response characteristics, respectively. A switch 70, controlled by a level detector 72 selectively couples the multiplexed chrominance signal at input terminal 74 to the two chrominance signal filters response to a DC level change in the signal applied to terminal 74. An integrated circuit containing the foregoing elements of processor 60 is the type TA8680 integrated circuit manufactured by Toshiba. Other processors are suitable provided they include some means for changing the chrominance signal filtering.

Control of the chrominance signal filtering provided by processor 60 is provided by control unit 54 which applies a DC voltage level to terminal 74 by means of an adder circuit 76 connected to the multiplexed chrominance signal output of multiplex switch 16. This method of filter control is used by the manufacturer of the aforementioned integrated circuit in order to reduce the pin-count of the integrated circuit. It is not, however, essential to use this form of filter selection control by DC level changes. In a given application the variable filtering circuit may be implemented by discrete circuit elements rather than in an integrated circuit in which case the chrominance signal filtering may be controlled directly rather than by adding DC levels to the chrominance signal and detecting the levels as shown.

The effect of always matching the chrominance signal filtering to the source providing the large picture is that in some cases the filtering will be correct for both pictures and in cases where the filtering is not optimum for the inset (small) picture the greater size of the correctly peaked large picture tends to mask the defects in the smaller picture due strictly to the difference in picture size. As a first example, assume that the user activates control 54 via remote control 55 to select the tuner video applied to switch 40. In this case, regardless of the position of picture swap switch 30 both the large picture and the small picture will display the signal provided by the tuner 50 and the variable filtering circuit will select the slope type chrominance peaking filter 68. Thus, in this case there is no chrominance signal sideband amplitude error for either picture. Now consider another case where switch 30 selects tuner video for the large picture processor and switch 40 selects the auxiliary video signal from terminal 42 for application to the small picture processor via switch 30. For this case control 54 will activate the slope type filter 68 and the tuner signal processed by the large picture processor will be correctly amplitude equalized but the auxiliary video processed by the small picture processor will be filtering by the tuner filter 68 rather than the correct (flat response) filter 66. For this case the greatest area of the picture will be correctly color sideband amplitude equalized which makes imperfections in filtering of the small picture relatively unnoticeable. The same result obtains if picture swap switch 30 is changed over to apply the auxiliary video to the large picture processor and to apply the tuner video to the small picture processor. This results because at the same time control 54 will also change over the filter selector switch 70 thereby providing normal filtering for the auxiliary video signal processed by the large picture processor and the sideband amplitude errors due to use of filter 66 on the tuner video processed by the small picture processor 14 will be relatively unnoticeable.

What is claimed is:

1. A color television receiver comprising:
   a picture-in-picture processor including a large picture processor, a small picture processor and a multiplex switch coupled to said processors for providing multiplexed luminance and chrominance output signals to a display for providing an image having a small picture area processed by said small picture processor that is inset within a larger picture area processed by the large picture processor;
   an input switch having a first state for applying first and second video input signals supplied thereto to respective inputs of said large and small picture processors and having a second state for interchanging the video signals applied to said processors; and
   a variable filtering circuit connected between a chrominance signal output of said multiplex switch and a chrominance signal input of said display processor, said variable filtering circuit having a first operating mode for applying a first filtering characteristic to said multiplexed chrominance signal when said first video signal is applied to said large picture processor and having a second operating mode for applying a second filtering characteristic to said multiplexed chrominance signal otherwise.

2. A color television receiver as recited in claim 1 wherein:
   said receiver includes a tuner, IF amplifier and detector unit for providing said first video signal to said input switch;
   said first filtering characteristic exhibits a sloped response within a chrominance signal band; and
   said second filtering characteristic exhibits a substantially uniform response within said chrominance signal band.

* * * * *

UNITED STATES PATENT AND TRADEMARK OFFICE
CERTIFICATE OF CORRECTION

PATENT NO. : 5,107,341

DATED : April 21, 1992

INVENTOR(S) : Gene K. Sendelweck & Bradley A. Sparks

It is certified that error appears in the above-identified patent and that said Letters Patent is hereby corrected as shown below:

On the Title page, under [73] Assignee:, that portion reading "Thompson Consumer Electronics, Inc., Indianapolis, Ind." should read -- Thomson Consumer Electronics, Inc., Indianapolis, Ind. --.

Signed and Sealed this

Twenty-second Day of June, 1993

Attest:

MICHAEL K. KIRK

Attesting Officer

Acting Commissioner of Patents and Trademarks